US 9,106,805 B2

(12) United States Patent
Kumagai et al.

(10) Patent No.: US 9,106,805 B2
(45) Date of Patent: Aug. 11, 2015

(54) IMAGE MEASURING SYSTEM

(71) Applicant: Kabushiki Kaisha TOPCON, Itabashi-ku, Tokyo-to (JP)

(72) Inventors: Kaoru Kumagai, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 417 days.

(21) Appl. No.: 13/658,066

(22) Filed: Oct. 23, 2012

(65) Prior Publication Data
US 2013/0107037 A1 May 2, 2013

(30) Foreign Application Priority Data

Oct. 26, 2011 (JP) ................. 2011-235041

(51) Int. Cl.
G06K 9/00 (2006.01)
H04N 7/18 (2006.01)
(Continued)

(52) U.S. Cl.
CPC .................. *H04N 7/18* (2013.01); *G01C 11/06* (2013.01); *G01C 15/002* (2013.01)

(58) Field of Classification Search
CPC .............................. G01C 15/002; H04N 7/18
USPC ........................... 382/131, 135, 136, 106, 108
See application file for complete search history.

(56) References Cited

U.S. PATENT DOCUMENTS 5,848,188 A * 12/1998 Shibata et al. ................. 382/203
6,334,773 B1 * 1/2002 Ahlen et al. .................... 433/29
7,342,650 B2   3/2008 Kern et al.

(Continued)

FOREIGN PATENT DOCUMENTS

| CN | 101103248 A | 1/2008 |
| CN | 101149252 A | 3/2008 |
| JP | 2006-503275 A | 1/2006 |

OTHER PUBLICATIONS

A 3D scanning system based on laser triangulation and variable field of view: Image Processing, 2005. ICIP 2005. IEEE International Conference on, Issue Date: Sep. 11-14, 2005, Written by: Franca, J.G.D.M.; Gazziro, M.A.; Ide, A.N.; Saito, J.H.*

(Continued)

*Primary Examiner* — Sath V Perungavoor
*Assistant Examiner* — Fabio Lima
(74) *Attorney, Agent, or Firm* — Nields, Lemack & Frame, LLC

(57) ABSTRACT

An image measuring system comprises a projection optical system, having a light source for emitting and projecting an illumination light through a light projection optical axis. The system further comprises a photodetection optical system, having an image pickup element, which receives a retroreflection light from an object to be measured through a photodetection optical axis, and a control arithmetic device for processing the data taken by the image pickup element. The projection optical system comprises a light projection unit for directing the light projection optical axis toward the object to be measured and projecting the illumination light, a projection angle changing means for rotating the light projection unit in an elevating and a horizontal direction and for changing a projection angle of the illumination light, and a direction detecting means for detecting a direction angle of the light projection optical axis with respect to the photodetection optical axis.

15 Claims, 6 Drawing Sheets

(51) Int. Cl.
*G01C 15/00* (2006.01)
*G01C 11/06* (2006.01)

(56) References Cited

U.S. PATENT DOCUMENTS

| | | | |
|---|---|---|---|
| 7,375,801 B1* | 5/2008 | Briscoe et al. | 356/3.1 |
| 2005/0275824 A1 | 12/2005 | Ohtomo et al. | |
| 2008/0075325 A1 | 3/2008 | Otani et al. | |
| 2008/0165357 A1* | 7/2008 | Stern et al. | 356/364 |
| 2009/0245653 A1* | 10/2009 | Kochi et al. | 382/203 |

OTHER PUBLICATIONS

Chinese communication, with English translation, issued Jul. 1, 2014 in corresponding Chinese patent application No. 201210415284.1.
Panasonic Electric Works news release, D-Imager 3D image sensor, May 27, 2010, 3 pages, English translation and Japanese original.
Time of Flight Range Image Sensor (IDL) product information, Research Project/(Time-of-Flight Distance Imaging Sensor), http://idl.rie.shizuoka.ac.jp/study/project/tof/index.html, Oct. 8, 2011, 2 pages, English translation and Japanese original.
Nippon Signal Co., Ltd., Eco Scan, Distance Imaging Sensors background and product information, copyright 1995-2012, 11 pages, English translation and Japanese original.

* cited by examiner

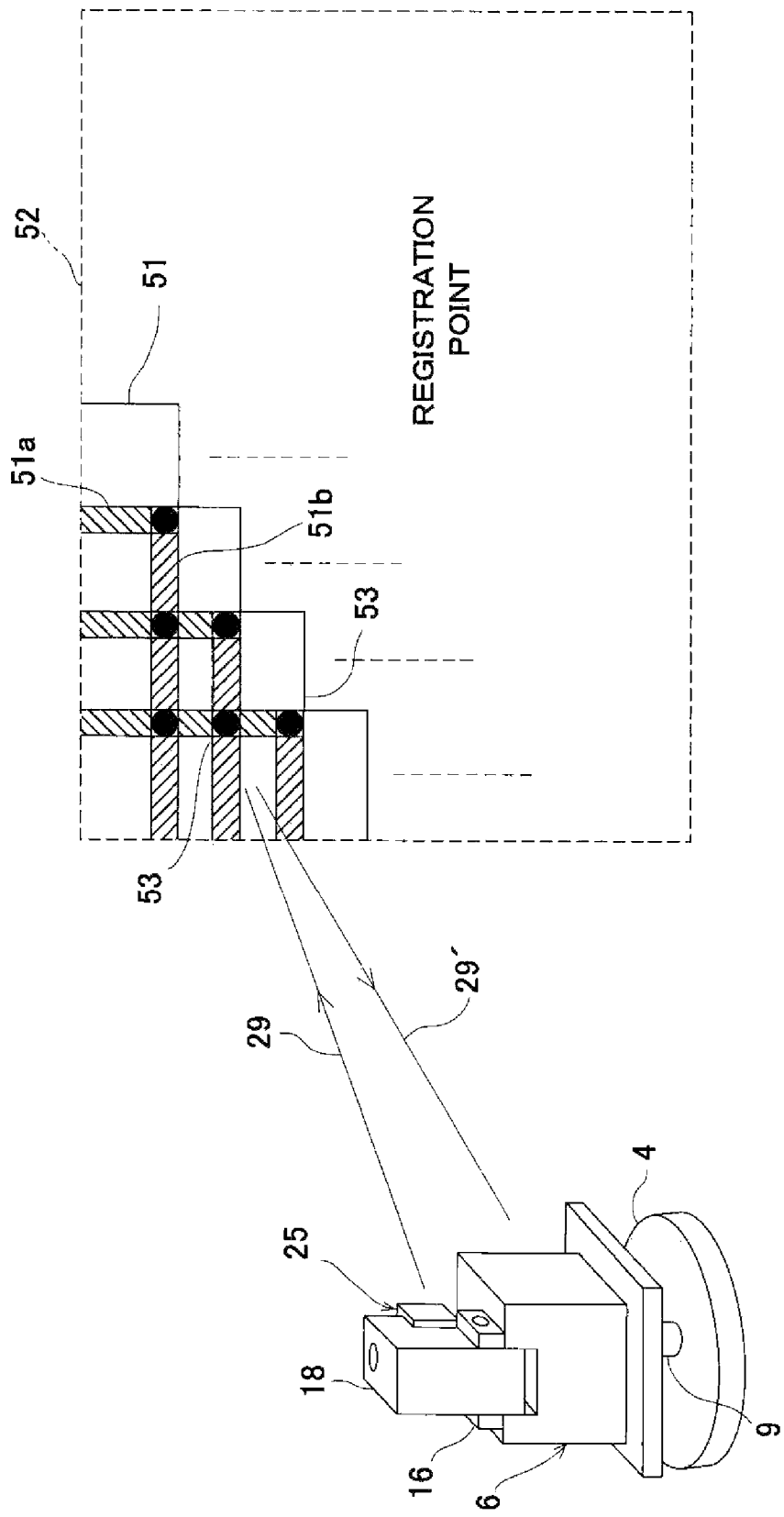

IMAGE MEASURING SYSTEM

BACKGROUND OF THE INVENTION

The present invention relates to an image measuring system for use in the indoor layout measurement or the measurement in the field of, e.g., the construction of buildings or the like.

As a system that performs the measurement in a predetermined target area or the measurement of an object to be measured, the acquisition of an image of a target area or the acquisition of an image of the object to be measured, and the association of a measurement result and an image, there is an image total station or a 3D image scanner.

Although the image total station has exclusive distance measuring function and angle measuring function and can superimpose the distance measurement and angle measurement data on an acquired image, a structure of the total station is fundamental, and the structure is complicated, for example, the total station has a vertical rotation axis or a horizontal rotation axis, and requires an angle detector that detects a rotational angle of the vertical rotation axis and the horizontal rotation axis or the like, hence the total station is an expensive apparatus.

Further, although the 3D image scanner can instantaneously measure a distance of a point, the 3D laser scanner requires a special light source that emits, e.g., a pulse laser beam or the like, also requires a vertical rotation axis and a horizontal rotation axis like the total station, has a complicated structure, and has a problem that the maintenance or the calibration is complicated.

SUMMARY OF THE INVENTION

It is an object of the present invention to provide an image measuring system that has a simple structure and enables readily acquiring an image of a target area or of an object to be measured and measuring a target area.

An image measuring system according to the present invention comprises a projection optical system which has a light projection optical axis and a light source for emitting an illumination light, and projects the illumination light through the light projection optical axis, a photodetection optical system which has a photodetection optical axis and an image pickup element, and receives a retroreflection light from an object to be measured by the image pickup element through the photodetection optical axis, and a control arithmetic device for processing the data taken by the image pickup element, and in the image measuring system, the projection optical system comprises a light projection unit for directing the light projection optical axis toward the an object to be measured and projecting the illumination light, a projection angle changing means for rotating the light projection unit in an elevating direction and a horizontal direction and for changing a projection angle of the illumination light, and a direction detecting means for detecting a direction angle of the light projection optical axis with respect to the photodetection optical axis.

Further, in the image measuring system according to the present invention, the control arithmetic device acquires an irradiation point as an image of the illumination light irradiating to the object to be measured together with an image of an image pickup area, and partially overlaps and connects a plurality of images of the image pickup areas with the irradiation point as a reference.

Further, in the image measuring system according to the present invention, the control arithmetic device partially overlaps and connects the plurality of images of the image pickup areas, and a reference for overlapping the plurality of images of the image pickup areas is feature points extracted from the images of the image pickup areas.

Further, in the image measuring system according to the present invention, the image pickup element is a range image sensor, and the range image sensor acquires an image of the object to be measured and three-dimensionally measures the object to be measured.

Further, in the image measuring system according to the present invention, the image pickup element is an aggregation of pixels, and the projection angle changing means changes a direction of the light projection optical axis in accordance with a pitch of the pixels.

Further, in the image measuring system according to the present invention, the light source is a semiconductor laser, and the semiconductor laser is configured to emit a light with the drive currents which are not higher than a threshold value and not lower than the threshold value.

Further, in the image measuring system according to the present invention, the direction detecting means comprises an optical member for dividing a part from the illumination light and a quadrant element for receiving a divided light led to the optical member.

Further, in the image measuring system according to the present invention, the direction detecting means comprises an optical member for dividing a part from the illumination light and a profile sensor for receiving a divided light led to the optical member.

Further, in the image measuring system according to the present invention, the light projection unit has a focus function.

Further, in the image measuring system according to the present invention, the semiconductor laser is configured so as to emit a light with the driving current which is not higher than the threshold value and to irradiate a wide range, and after capture of the object to be measured by the image pickup element, the semiconductor laser is configured so as to emit a light with the driving current which is not lower than the threshold value and to irradiate a necessary point of the object to be measured.

Further, in the image measuring system according to the present invention, the light projection unit has a luminous flux diameter expanding means for expanding a luminous flux of the illumination light.

Further, in the image measuring system according to the present invention, the projection unit is configured so as to expand the luminous flux by the luminous flux diameter expanding means and to irradiate a wide range, and capture of the object to be measured by the image pickup element, the projection unit is configured to contract the luminous flux and to irradiate a necessary point of the object to be measured.

Further, in the image measuring system according to the present invention, the luminous flux diameter expanding means is a diffuser which is provided so as to be insertable into or removable from the light projection optical axis.

Further, in the image measuring system according to the present invention, the photodetection optical system has a power varying function of increasing a photodetecting magnification.

According to the present invention, the image measuring system comprises a projection optical system which has a light projection optical axis and a light source for emitting an illumination light, and projects the illumination light through the light projection optical axis, a photodetection optical system which has a photodetection optical axis and an image pickup element, and receives a retroreflection light from an object to be measured by the image pickup element through the photodetection optical axis, and a control arithmetic device for processesing the data taken by the image pickup element, and in the image measuring system, the projection optical system comprises a light projection unit for directing the light projection optical axis toward the an object to be measured and projecting the illumination light, a projection angle changing means for rotating the light projection unit in an elevating direction and a horizontal direction and for changing a projection angle of the illumination light, and a direction detecting means for detecting a direction angle of the light projection optical axis with respect to the photodetection optical axis. As a result, an arbitrary point in an image pickup area taken by the photodetection optical system can be irradiated with the illumination light, and the direction angle of the irradiation point can be measured by the direction detecting means or based on a position of the irradiation point image on the image pickup element.

Further, according to the present invention, in the image measuring system, the control arithmetic device acquires an irradiation point as an image of the illumination light irradiating to the object to be measured together with an image of an image pickup area, and partially overlaps and connects a plurality of images of the image pickup areas with the irradiation point as a reference. As a result, the images of the image pickup areas enable performing the measurement in the wider range.

Further, according to the present invention, in the image measuring system, the image pickup element is a range image sensor, and the range image sensor acquires an image of the object to be measured and three-dimensionally measures the object to be measured. As a result, the image with the three-dimensional data can be easily acquired.

Further, according to the present invention, in the image measuring system, the image pickup element is an aggregation of pixels, and the projection angle changing means changes a direction of the light projection optical axis in accordance with a pitch of the pixels. As a result, the angular resolving power can be improved.

Further, according to the present invention, in the image measuring system, the light source is a semiconductor laser, and the semiconductor laser is configured to emit a light with the drive currents which are not higher than a threshold value and not lower than the threshold value. As a result, an illumination light for irradiating a wide range and an illumination light for the pinpoint irradiation can be easily changed over.

Further, according to the present invention, in the image measuring system, the direction detecting means comprises an optical member for dividing a part from the illumination light and a quadrant element for receiving a divided light led to the optical member, and the direction detecting means comprises an optical member for dividing a part from the illumination light and a profile sensor for receiving a divided light led to the optical member. As a result, a direction angle of the irradiation point can be measured based on a detection result of the quadrant element or the profile sensor.

Further, according to the present invention, in the image measuring system, the light projection unit has a focus function. As a result, the irradiation point can be irradiated in a pinpoint manner, and the S/N of the retroreflection light can be increased.

Further, according to the present invention, in the image measuring system, the light projection unit has a luminous flux diameter expanding means for expanding a luminous flux of the illumination light. As a result, the illumination using the illumination light can be performed in the wide range, and capturing of an object to be measured can be facilitated.

Further, according to the present invention, in the image measuring system, the luminous flux diameter expanding means is a diffuser which is provided so as to be insertable into or removable from the light projection optical axis. As a result, the luminous flux of the illumination light can be easily expanded.

Furthermore, according to the present invention, in the image measuring system, the photodetection optical system has a power varying function of increasing a photodetecting magnification. As a result, the angular resolving power can be further improved.

BRIEF DESCRIPTION OF THE DRAWINGS

FIG. 11 is an explanatory view when a wider range than an image pickup area is measured.

DETAILED DESCRIPTION OF THE PREFERRED EMBODIMENTS

Description will be given bellow on an embodiment according to the present invention by referring to the attached drawings.

Figure 1:
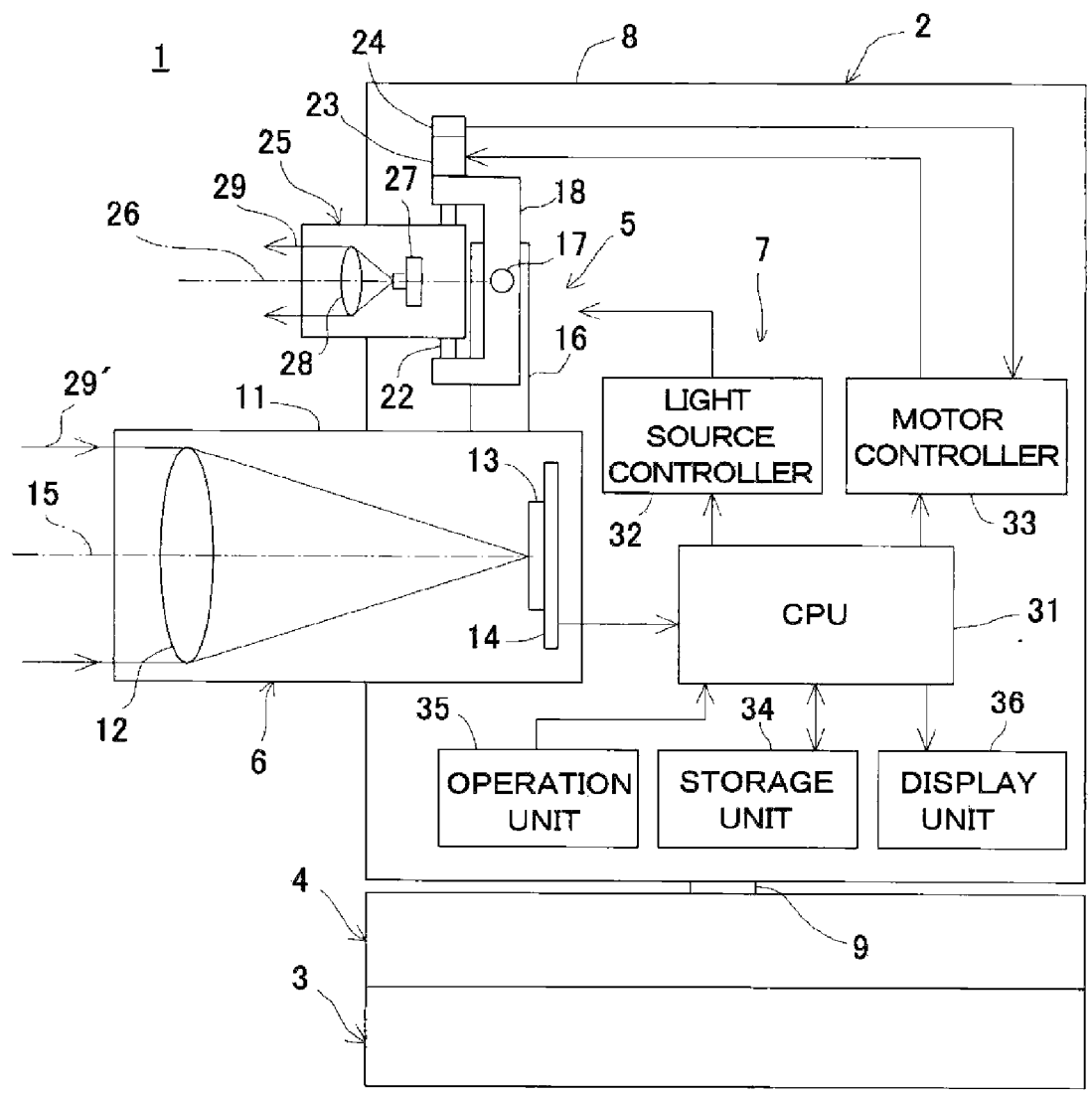
FIG. 1 is a schematic block diagram showing an image measuring system according to an embodiment of the present invention.

FIG. 1 shows an image measuring system 1 according to a first embodiment according to the present invention.

The image measuring system 1 is mainly constituted of a measuring system main unit 2, a leveling unit 3, and a rotary mechanism 4. The rotary mechanism 4 is provided on the leveling unit 3, and the measuring system main unit 2 is provided to the rotary mechanism 4 through a rotation axis 9. The leveling unit 3 has a leveling function that levels the measuring system main unit 2 to a horizontal posture through the rotary mechanism 4, and the rotary mechanism 4 has a function that rotationally moves the measuring system main unit 2 in the horizontal direction.

The measuring system main unit 2 comprises a projection optical system 5, a photodetection optical system 6, a control arithmetic device 7, and a casing 8, and the projection optical system 5, the photodetection optical system 6, and the control arithmetic device 7 are accommodated in the casing 8.

The photodetection optical system 6 includes a body tube 11. A photodetection lens 12, an image pickup element 13 installed at a substantially focal position of the photodetection lens 12, and a printed circuit 14 having the image pickup element 13 mounted thereon are accommodated in the body tube 11. The photodetection lens 12 is arranged on a photodetection optical axis 15, and the photodetection optical axis 15 horizontally extends and runs through the center of the image pickup element 13.

The photodetection lens 12 typically represents a lens group constituting an optical system. Further, the image pickup element 13 is constituted of many pixels of, e.g., a CCD or a CMOS sensor etc. A coordinate position of each pixel is specified with a point running through the photodetection optical axis 15 being determined as an origin point, each photodetection signal, and the emitted photodetection signal and the coordinate position are associated with each other.

A retroreflection light 29' enters the photodetection lens 12 from the object to be measured, and an image of the retroreflection light 29' is formed on the image pickup element 13.

The projection optical system 5 will now be described.

The projection optical system 5 has a bifurcated frame 16 coupled with the body tube 11, a horizontal rotation axis 17 is rotatably provided to the bifurcated frame 16, and an elevation rotation frame 18 is secured to the horizontal rotation axis 17 so as to integrally rotate with the horizontal rotation axis 17. The horizontal rotation axis 17 is horizontal and extends in a direction orthogonal to the photodetection optical axis 15, and a distance between the photodetection optical axis 15 and a shaft center of the horizontal rotation axis 17 is known.

Figure 2:
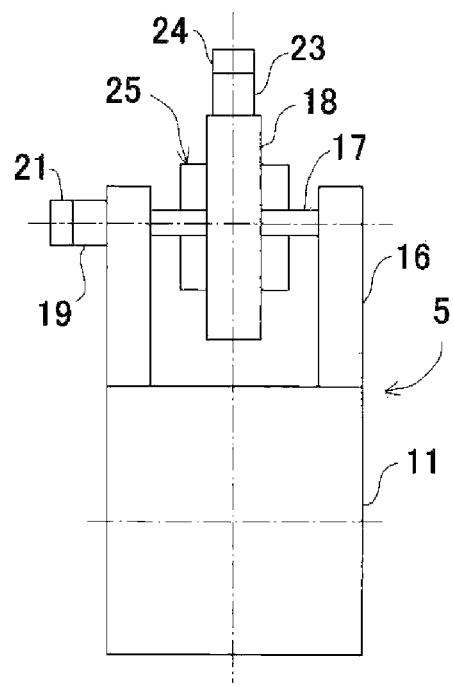
FIG. 2 is a rear elevation of a projection optical system portion in the image measuring system.

As shown in FIG. 2, an elevation motor 19 is provided at one end of the horizontal rotation axis 17, and an elevation angle detector, e.g., an elevation angle encoder 21 is provided to the elevation motor 19. The elevation rotation frame 18 is tilted by the elevation motor 19 through the horizontal rotation axis 17, and a tilt angle of the elevation motor 19 is detected by the elevation angle encoder 21.

Furthermore, a rotation range of the elevation rotation frame 18 provided by the elevation motor 19 and a rotation range of a light projection unit 25 provided by a horizontal motor 23, that is, rotation ranges of an illumination light 29 are set so as to become equivalent to or more than a field angle of the photodetection optical system 6.

Each of the elevation angle encoder 21 and a horizontal angle encoder 24 (which will be described later) has 0° which is a reference point, and a position where the retroreflection light 29' of the illumination light 29 is received at the center of the image pickup element 13 is 0° of each of the elevation angle encoder 21 and the horizontal angle encoder 24. Moreover, the elevation angle encoder 21 and the horizontal angle encoder 24 constitute a direction detecting means. The direction detecting means detects an exit direction of the illumination light 29 and also detects a relationship between the photodetection optical axis 15 and a light projection optical axis 26.

The elevation rotation frame 18 is formed into a channel shape having horizontally protruding portions at an upper end and a lower end thereof, and a vertical rotation axis 22 that pierces through the upper and lower horizontally protruding portions is rotatably provided. The horizontal motor 23 is provided at an upper end of the vertical rotation axis 22, and a horizontal angle detector, e.g., the horizontal angle encoder 24 is provided to the horizontal motor 23. The vertical rotation axis 22 extends in the vertical direction at a reference position (a position where the light projection optical axis 26 and the photodetection optical axis 15 are parallel to each other) and is orthogonal to the horizontal rotation axis 17.

The light projection unit 25 is secured to the vertical rotation axis 22, the light projection unit 25 integrally rotates with the vertical rotation axis 22, the light projection unit 25 is rotated by the horizontal motor 23 through the vertical rotation axis 22. An amount of rotation, i.e., a horizontal angle of the light projection unit 25 is detected by the horizontal angle encoder 24.

The light projection unit 25 has the light projection optical axis 26, and a light source 27 and a projection lens 28 are arranged on the light projection optical axis 26. The light source 27 emits the illumination light 29 which is a visible light or an invisible light. Additionally, the projection lens 28 typically represents a lens group constituting the projection optical system 5. It is to be noted that a focusing mechanism may be provided to the projection optical system 5.

The control arithmetic device 7 will now be described.

The control arithmetic device 7 mainly comprises an arithmetic processing unit (CPU) 31, a light source controller 32, a motor controller 33, a storage unit 34, an operation unit 35, and a display unit 36.

The light source controller 32 allows the light source 27 to emit a light at the necessary timing, and the motor controller 33 drives the elevation motor 19 and the horizontal motor 23 at the necessary timing. The light source controller 32 and the light source 27 constitute the light emitting means, and the elevation motor 19, the horizontal motor 23, and the motor controller 33 constitute the projection angle changing means.

As the storage unit 34, a storage device such as a semiconductor memory device, various kinds of memory cards, an HDD, and others is used. The storage unit 34 has a program storage region and a data storage region.

In the program storage region are stored the various kinds of programs required for the operations and the distance measurement of the image measuring system 1.

The various kinds of programs include: a timing control program for controlling the timing, e.g., the light emission timing of the light source controller 32 or the light-receiving timing of the image pickup element 13 or the like; a measurement program for determining a light-receiving position of the retroreflection light 29' on the image pickup element 13 based on a position of a light receiving pixel, for measuring a distance to a measuring point based on a deviation of time between the light emission timing of the illumination light 29 and the timing of receiving the retroreflection light 29' by the image pickup element 13, for determining the light-receiving position of the retroreflection light 29' by the image pickup element 13 based on the position of the light receiving pixel, for measuring a horizontal angle and an elevation angle of the measuring point, and further, for performing the 3D measurement of the measuring point based on the results of the distance measurement and the angle measurement; a projection control program for controlling an irradiating direction of the illumination light 29 according to an instruction from the operation unit 35 and based on the measurement results from the elevation angle encoder 21 and the horizontal angle encoder 24; a signal conversion program for converting a signal input from the operation unit 35 into an instruction signal; a display program for displaying on the display unit 36, e.g., an image of a target measurement area, a measuring state, or the measuring points in the target measurement area etc.; an image combining program for combining a plurality of taken images acquired by the photodetection optical system 6 and for providing an image including a wide image pickup area when the target measurement area is larger than an image pickup area (a signal image) acquired by the photodetection optical system 6; and others.

Further, the data storage region stores the image data of the image pickup area which are acquired by the image pickup element 13 (an area determined by a field angle of the photodetection optical system 6) and also stores the distance measurement data, the angle measurement data, and the 3D data of the measuring point in association with a coordinate position.

The operation unit 35 receives the information required for an operator to carry out an operation and also receives an instruction for carrying out the operation.

On the display unit 36, various kinds of information, e.g., an image acquired by the photodetection optical system 6, a cursor to indicate the measuring point in the image, or the measurement conditions etc. are displayed. A touch panel may be used as the display unit 36 so that the measuring point can be specified, the information required for an operator to perform an operation can be input, or an instruction for performing an operation can be input from the display unit 36.

Functions of a first embodiment will now be described.

The image measuring system 1 is installed at a predetermined position, e.g., the center in a room. The measurement system main unit 2 is leveled by the leveling unit 3. The measuring system main unit 2 is rotated and positioned in a predetermined direction by the rotary mechanism 4 condition the measuring system main unit 2 is leveled.

An image of a target area is taken by the photodetection optical system 6, and the taken target area is displayed on the display unit 36. The measuring point is determined in the displayed target area, and the measuring point is specified by the operation unit 35. The light source 27 is driven by the light source controller 32, and the illumination light 29 is emitted as a pulsed light.

When the measuring point is specified, the elevation motor 19 and the horizontal motor 23 are driven and controlled by the arithmetic processing unit 31 in such a manner that the illumination light 29 emitted from the projection optical system 5 is irradiated to the measuring point. Additionally, a reflected light (the retroreflection light 29') of the illumination light 29 from the measuring point is received by the image pickup element 13 through the photodetection lens 12. A photodetection signal of the image pickup device 13 is input to the arithmetic processing unit 31, the signal processing is executed and the light-receiving position is calculated by the arithmetic processing unit 31. And an arithmetic result is displayed on the display unit 36 as an image. Therefore, the irradiation point (an image of the irradiation point) is displayed on the display unit 36 so as to be superimposed on an image of the target area.

Further, when the projection optical system 5 comprises a focusing mechanism, the focusing mechanism is operated so that the illumination light 29 is condensed on the measuring point. When the illumination light is condensed on the measuring point, the light intensity of the retroreflection light 29' from the measuring point is increased, the S/N is increased, and a measurement accuracy is improved. Additionally, a focusing state is confirmed by a state shown on the display unit 36. Furthermore, if the illumination light 29 is a visible light, the focusing state may be visually confirmed.

When the measuring point is set and the illumination light 29 is emitted to the measuring point, the retroreflection light 29' is detected, and a distance to the measuring point is measured based on a time difference between the light emission timing of the illumination light 29 and the light-receiving timing of the retroreflection light 29'. Moreover, an elevation angle and a horizontal angle with the photodetection optical axis 15 as a reference are obtained from the light-receiving position of the retroreflection light 29' on the image pickup element 13. Additionally, the three-dimensional data, of which the center of the image pickup element 13 is an origin point, is calculated by the arithmetic processing unit 31 based on the distance measurement result of the measuring point, on the elevation angle, and on the horizontal angle.

It is to be noted that the setting of the measuring point may be carried out on the display unit 36 or, when the illumination light 29 is a visible light, an operator may visually confirm and determine the irradiation position of the illumination light 29.

In the measurement operation, the photodetection system is fixed, rotating of the light projection unit 25 (i.e., the light projection optical axis 26) alone can suffice. A rotating portion is the light projection unit 25 only, is lightweight, and a structure can be simplified. Further, since the position of the irradiation point is measured from the photodetection result of the image pickup element 13, and hence a high accuracy is not required for driving the light projection unit 25.

Therefore, an image of the target area can be acquired, and three-dimensional measurement can be performed easily on an arbitrary position on an arbitrary point in the target area. Further, by the fact that an image of the measuring point is superimposed on an image of the target area and an obtained image is stored, an operation of confirming a measurement situation or the measuring point can be facilitated.

Furthermore, the illumination light 29 is subjected to the pulse light emission, the elevation motor 19 and the horizontal motor 23 are controlled, the illumination light 29 is used for the scan in the horizontal direction and the vertical direction at a predetermined speed, and the 3D data of the entire target measurement area can be consequently acquired.

Figure 3A:
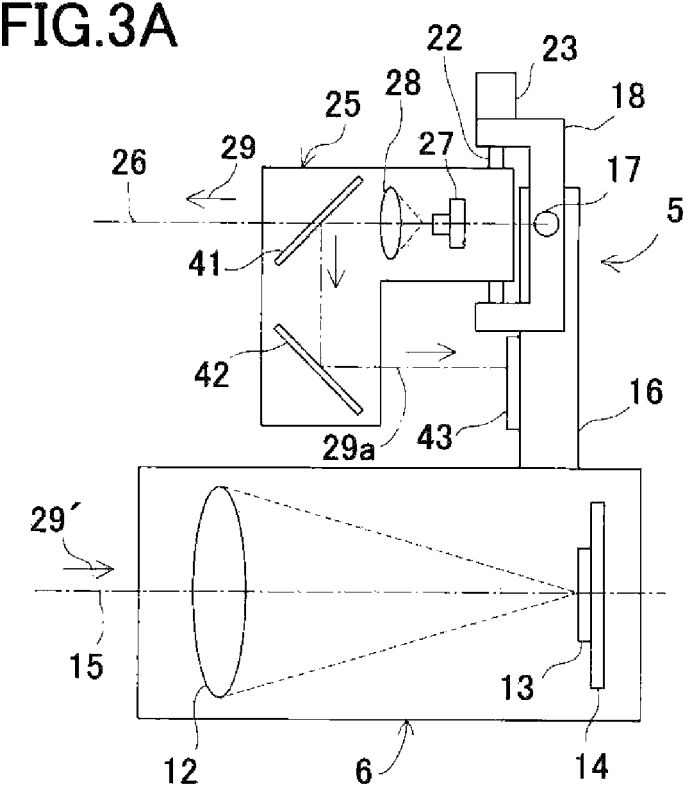
FIG. 3A is a schematic block diagram to represent a primary part of the image measuring system and to show a first modification of the projection optical system.

FIG. 3 shows a first modification of the projection optical system 5.

In the first embodiment, the direction detecting means is constituted of the elevation angle encoder 21 and the horizontal angle encoder 24, but the direction detecting means is constituted of a profile sensor 43 in the first modification.

In FIG. 3, the same component as shown in FIG. 1 is referred by the same symbol.

On the light projection optical axis 26, a half-mirror 41 as a luminous flux splitting member is arranged at a position on a side of the object to be measured of the projection lens 28, and a mirror 42 as a deflection member is arranged on an optical axis divided by the half-mirror 41. The illumination light 29 that has passed through the projection lens 28 is divided by the half-mirror 41, and a divided partial light 29a is reflected by the mirror 42. The partial light 29a reflected by the mirror 42 is parallel to the light projection optical axis 26.

At a position of the bifurcated frame 16 opposite to the mirror 42, the profile sensor 43 is provided. Further, in a case where the light projection optical axis 26 is at a reference position, the partial light 29a vertically enters the profile sensor 43.

Figure 3B:
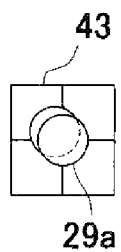
FIG. 3B is an explanatory view showing a profile sensor of the projection optical system.

As shown in FIG. 3B, the profile sensor 43 is a photodetection sensor (a quadrant element) having a light-receiving surface quartered by two straight lines orthogonal to each other, the light-receiving amount of the divided portions are compared with each other. When the respective divided portions have the same light-receiving amount, it is judged that the center of the luminous flux coincides with the center of the light-receiving surface. In the first modification, a state that the center of the luminous flux coincides with the center of the light-receiving surface is judged as a reference position of the light projection unit 25.

A horizontal angle and an elevation angle of the light projection optical axis 26 are corresponded to a displacement of the partial light 29*a* with respect to the center of the profile sensor 43 on a 1:1 level, and detecting a light-receiving position of the partial light 29*a* by the profile sensor 43 enables detecting a projecting direction of the light projection optical axis 26. Therefore, the half-mirror 41, the mirror 42, and the profile sensor 43 constitute the direction detecting means. It is to be noted that, as the profile sensor 43, for example, a two-dimensional CCD profile sensor or a two-dimensional CMOS profile sensor or the like is used.

Figure 4:
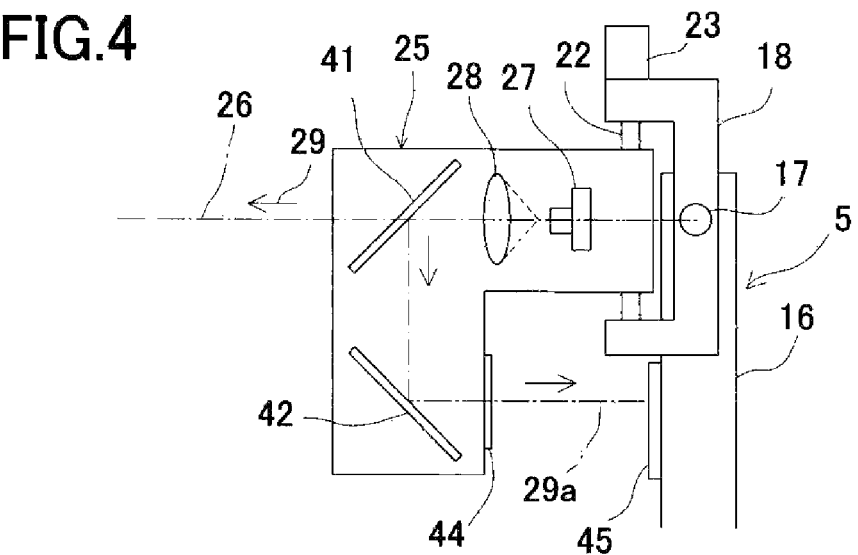
FIG. 4 is a schematic block diagram showing a second modification of the projection optical system.

FIG. 4 shows a second modification of the projection optical system 5.

In the above-mentioned first modification, the direction detecting means is constituted of the half-mirror 41, the mirror 42, and the profile sensor 43, but in the second modification, an absolute pattern 44 and a photodetection element 45 are used as a sensor that detects a position of the partial light 29*a*.

In FIG. 4, the same component as shown in FIG. 3 is referred by the same symbol.

In the same way as the first modification, the illumination light 29 is divided into a part by the half-mirror 41 and the mirror 42, and the divided light vertically enters the photodetection element 45 as the partial light 29*a*.

The absolute pattern 44 is provided on a light path of the partial light 29*a* reflected by the mirror 42, and the partial light 29*a* passes through the absolute pattern 44 and is received by the photodetection element 45. Therefore, the photodetection element 45 detects an image of the absolute pattern 44 at a portion through which the partial light 29*a* has passed and detects a position of the partial light 29*a*.

Since the photodetection element 45 detects a deviation of the partial light 29*a* from a reference position according to a received pattern and the deviation is corresponded to each of an elevation angle and a horizontal angle of the light projection optical axis 26 on a 1:1 level, the elevation angle and the horizontal angle of the light projection optical axis 26 can be detected based on the detection result of the photodetection element 45.

Figure 5:
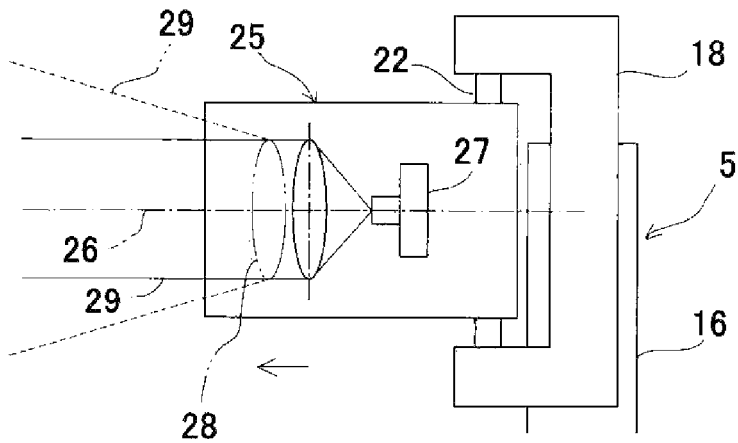
FIG. 5 is a schematic block diagram showing a third modification of the projection optical system.

FIG. 5 shows a third modification of the projection optical system 5.

In the third modification, the luminous flux diameter expanding means is provided to the light projection unit 25.

In the third modification, as the luminous flux diameter expanding means, a position varying mechanism that moves a position of the projection lens 28 in an optical axis direction is provided. When a position of the projection lens 28 is changed, the luminous flux of the illumination light 29 is expanded, and a wider range can be irradiated. It is to be noted that the projection lens 28 may be used as a liquid lens and a focal length of the projection lens 28 may be changed so that a spread angle of the illumination light 29 can be changed.

Therefore, the luminous flux of the illumination light 29 is expanded, and in a state that an illumination range is first increased, an outline of an object to be measured is captured, and then the illumination light 29 is condensed in such a manner that the luminance of the illumination light at the measuring point can be increased.

Figure 6:
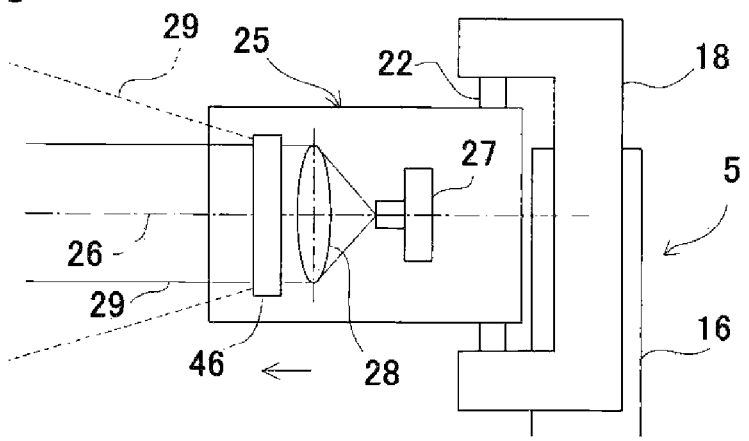
FIG. 6 is a schematic block diagram showing a fourth modification of the projection optical system.

FIG. 6 shows a fourth modification of the projection optical system 5.

In the fourth modification, as the luminous flux diameter expanding means, a diffuser 46 is provided on the side of the object to be measured of the projection lens 28, and the diffuser 46 can be inserted into or removed from the light projection optical axis 26.

In a state that the diffuser 46 is inserted in the light projection optical axis 26, when the illumination light 29 is irradiated, a luminous flux of the illumination light 29 is expanded by the diffuser 46, and the object to be measured is irradiated in wide range. When the diffuser 46 is removed, the illumination light 29 is irradiated to the object to be measured in a condensed state.

According to a fifth modification of the projection optical system 5, a semiconductor laser is used as the light source 27, a current value for impressing the electric current to the light source 27 is controlled, and the luminous flux of a light emitted from the light source 27 is expanded or contracted.

Figure 7A:
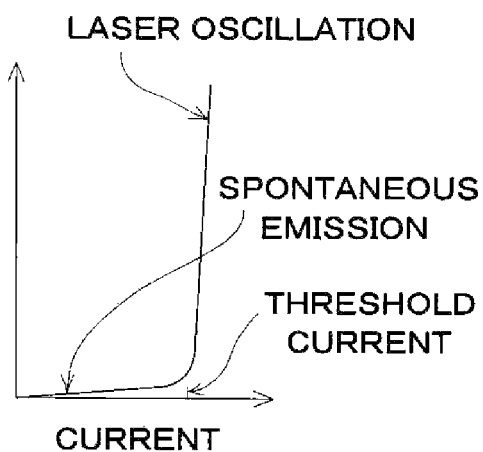
FIG. 7A is a graph showing a current value and a light emission state when the electric current is impressed to a semiconductor laser.
Figure 7B:
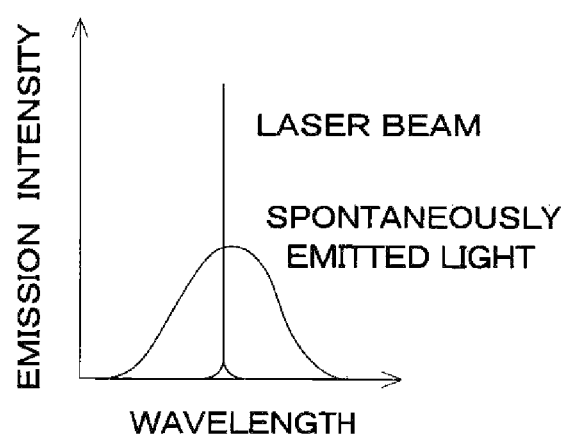
FIG. 7B is a graph showing a relationship between the emission intensity and an emission wavelength when current values are not greater than a threshold value and exceeds the threshold value in a situation that the electric current is impressed to the semiconductor laser.

As shown in FIG. 7A and FIG. 7B, it is known that a semiconductor laser oscillates a laser when a current for impressing the electric current to the semiconductor laser exceeds a threshold value. Therefore, when the object to be measured is irradiated in wide range, the light source 27 is impressed with an electric current that is not greater than the threshold value so that a light is spontaneously emitted. When the measuring point is irradiated partly or when the measurement is executed, the light source 27 is impressed with an electric current that is larger than the or equal to threshold value so that a laser beam is irradiated.

Next, a first modification of the photodetection optical system 6 will now be described.

In the first modification, a power varying function is added to the photodetection lens 12.

Figure 8:
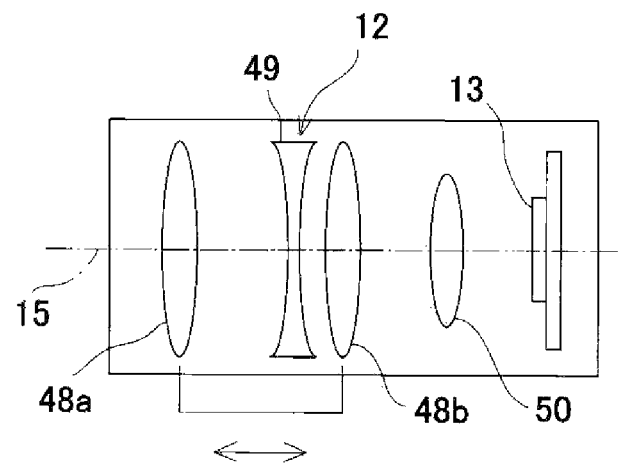
FIG. 8 is an explanatory view showing an example of a configuration having a power varying function in a photodetection lens used in a photodetection optical system.

FIG. 8 shows an example of the photodetection lens 12 having the power varying function. In FIG. 8, reference numerals 48*a* and 48*b* denote focusing lenses that integrally move along the photodetection optical axis 15 and 49 is a concave lens fixedly provided between the focusing lenses 48*a* and 48*b* and 50 is a relay lens provided between the focusing lens 48*b* and the image pickup element 13.

When the focusing lenses 48*a* and 48*b* are moved, an image formed on the image pickup element 13 can be enlarged or reduced.

When the power varying function is provided to the photodetection optical system 6, an image of the object to be measured can be enlarged, and a resolving power of the image pickup can be improved.

The horizontal and vertical oscillation angles of the illumination light 29 provided by the projection optical system 5 correspond to a resolving power corresponding to a pixel pitch of the image pickup element 13. That is, each of the rotation of the elevation rotation frame 18 performed by the elevation motor 19 and the rotation of the light projection unit 25 performed by the horizontal motor 23 has an angular resolving power that enables rotating an angle (a horizontal angle and an elevation angle) of the light projection optical axis 26 at a pixel pitch of the image pickup element 13 (see FIG. 1).

Therefore, when a magnification is increased by the photodetection optical system 6, an angle of one pixel pitch with respect to the image of the object to be measured is relatively decreased, and an angular resolving power of the projection optical system 5 is improved.

Figure 9:
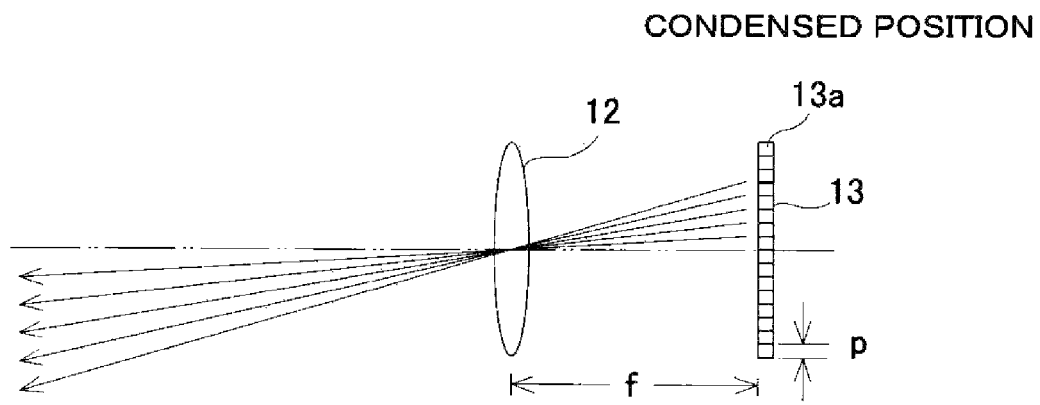
FIG. 9 is an explanatory view showing a relationship between an image pickup element and an incidence angle in the photodetection optical system.

FIG. 9 shows an angular resolving power when the image pickup element 13 is arranged at a focal position of the photodetection lens 12. A resolving power of the angular measurement with respect to a target object can be obtained by arcTAN (a pixel pitch p/a focal length f of the photodetection lens 12). Therefore, appropriately selecting a combination of a pixel number (i.e., the pixel pitch) of the image pickup element 13 and a focal length of the photodetection lens 12 enables obtaining a desired angular resolving power.

The image pickup element 13 is constituted of the pixels 13a. When a CCD or a CMOS sensor is used, the photodetection intensity can be detected in units of the pixels 13a. Therefore, even when a diameter of the luminous flux whose image is formed on the image pickup element 13 is larger than the pixel pitch, a barycentric position of a light-receiving image of the retroreflection light 29' is detected based on a signal from the pixels, and the light-receiving position of the retroreflection light 29' can be consequently detected with the resolution in units of the pixels.

Further, when a detection result of the light-receiving position of the retroreflection light 29' on the image pickup element 13 is fed back to the control of a driving unit of the light projection unit 25, the resolving power of the light projection unit 25 in the projecting direction can be improved to the pixel unit.

Figure 10:
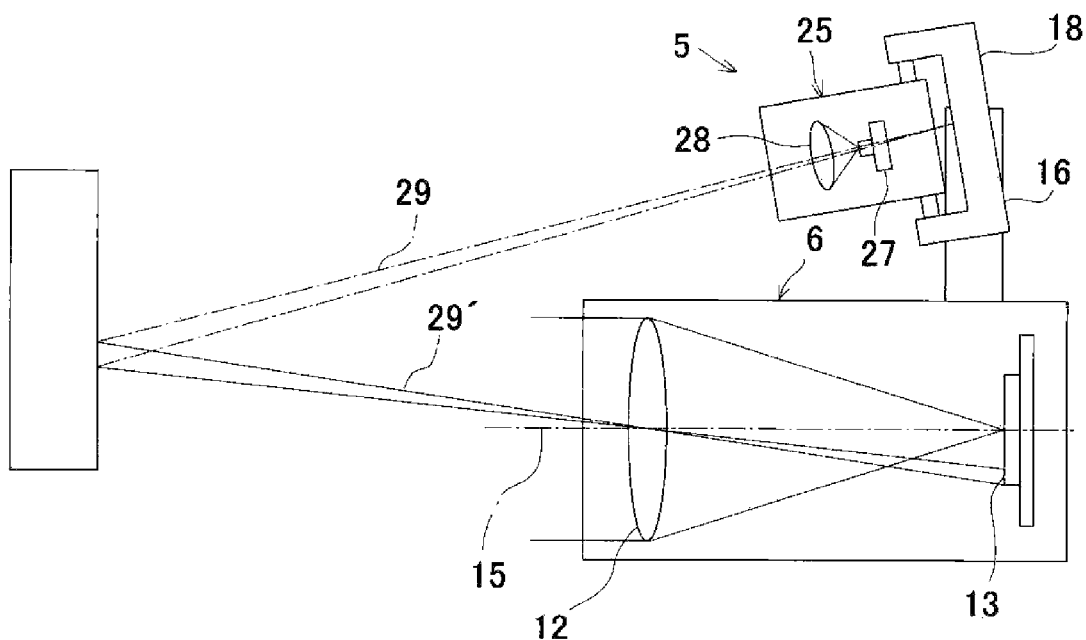
FIG. 10 is an explanatory view showing a change in a photodetecting position of a retroreflection light on the image pickup element when a light projection unit exit angle is changed.

FIG. 10 illustrates a change in the light-receiving position of the retroreflection light 29' on the image pickup element 13 when the elevation angle or the horizontal angle of the light projection unit 25 is changed and the projecting direction of the illumination light 29 is changed. It is to be noted that FIG. 10 shows a situation where the elevation angle is changed.

Referring to FIG. 10, by controlling the angular displacement of the light projection unit 25, the light-receiving position on the image pickup element 13 can be displaced in accordance with each pixel pitch. By increasing a photodetecting magnification using the power varying function of the photodetection lens 12, the positional displacement can be relatively reduced on an enlarged light-receiving image. As a result, the angular resolving power can be improved.

Furthermore, in the image measuring system 1 shown in FIG. 1, the third modification of the projection optical system 5 shown in FIG. 5, the fourth modification shown in FIG. 6, or the fifth modification shown in FIG. 7 can be applied so that the luminous flux of the illumination light 29 can be expanded or reduced, and the power varying optical system illustrated in FIG. 8 can be applied to the photodetection optical system 6 so that the photodetecting magnification can be increased or reduced.

When the modification of the projection optical system 5 is applied, a wider range can be illuminated with the illumination light 29, the object to be measured can be easily captured. The luminous flux of the illumination light 29 can be expanded or contracted after capturing, the measuring point can be irradiated with the illumination light 29 having the high luminance, and S/N of the retroreflection light 29' from the measuring point can be improved. Further, by receiving the photodetecting magnification of the photodetection optical system 6, the angular resolving power can be improved. Therefore, the easiness of operations and the workability can be improved, and a measurement accuracy can be enhanced.

A second embodiment, when a distance image element is used as an image pickup element 13 in the foregoing embodiment, will now be described with reference to FIG. 1, FIG. 5, FIG. 6, and FIG. 8.

Here, the distance image element is constituted of many pixels, and it is possible to take the image of an object to be measured, to measure a time required for a light irradiated to the object to be measured to be received by the range image element after the reflection in accordance with each pixel, and to acquire a three-dimensional distance image in real time.

In the second embodiment, as a projection optical system 5, a function that enables expanding or contracting a luminous flux of an illumination light 29 (see FIG. 5 and FIG. 6) is provided, and as a photodetection optical system 6, a function that enables increasing or reducing the photodetecting magnification (see FIG. 8) is provided.

First, the luminous flux of the illumination light 29 is increased by the luminous flux diameter expanding means of the projection optical system 5, and the irradiation is carried out in a wide range so that a object to be measured can be captured as easy as possible. When the object to be measured is captured, the luminous flux of the illumination light 29 is narrowed, and the luminous flux is irradiated limitedly on a necessary point of the object to be measured in a pinpoint manner.

A retroreflection light 29' from the necessary point enters the image pickup element 13 which is the distance image element, and a distance to the necessary point of the object to be measured is measured in accordance with each pixel of the image pickup element 13. Moreover, an elevation angle and a horizontal angle are measured from a position of each pixel on the image pickup element 13. Therefore, the necessary point can be three-dimensionally measured.

In this embodiment, the object to be measured can be easily captured, the measuring point can be easily selected, the S/N can be increased, and the three-dimensional measurement can be highly accurately carried out.

The measurement is carried out in a wide range in a situation where a measurement accuracy is increased will now be described.

When a photodetecting magnification is increased, a resolving power of the angular measurement is raised and an accuracy is improved but, on the other hand, a field angle is reduced, an image pickup area of the photodetection optical system 6 is narrowed, and a measurement range is also narrowed.

In a situation where a wider target area than the image pickup area is set, when the image pickup area is fitted in the target area like a patchwork, the measurement range is increased.

FIG. 11 shows how image pickup area images 51 and 51 adjacent to each other are positioned, connected, and fitted in a target area 52.

As one of methods for connecting the image pickup area images 51, the image pickup area images 51 and 51 adjacent to each other are overlapped and connected at an overlap portion 51a alone in the horizontal direction, and the image pickup area images 51 and 51 are overlapped and connected at an overlap portion 51b alone in the vertical direction. By using the overlap portions 51a and 51b, the image pickup area images 51 and 51 adjacent to each other are positioned, and the continuity of the image pickup area images 51 adjacent to each other is assured.

Further, when by using the overlap portions 51a and 51b, the image pickup area images 51 and 51 adjacent to each other are positioned, the object to be measured is irradiated with the illumination light 29 in a pinpoint manner, and an irradiation point 53 irradiated with the illumination light 29 can be used as a reference point. For example, when an image pickup area of the photodetection optical system 6 is moved (i.e., when a light projection optical axis 26 is moved in an opposite direction of a moving direction of a photodetection optical axis 15) in such a manner that a position of the irradiation point 53 of the illumination light 29 is not changed, the irradiation point 53 can be used as a common point to the image pickup area images 51 adjacent to each other, a coordinate of the irradiation point 53 in each image pickup area image 51 can be immediately specified by a photodetection signal from the image pickup element 13, and combining the images adjacent to each other based on a coordinate value as acquired enables connecting the image pickup area images 51 adjacent to each other without executing the image processing.

Furthermore, a plurality of points may be irradiated in a pinpoint manner, the points subjected to the irradiation may be extracted as the feature points, and the image pickup area images 51 and 51 adjacent to each other may be overlapped based on the extracted feature points. In this case, when the feature points effective for the image pickup area images 51 and 51 are found, a luminous flux of the illumination light 29 is focused, and the irradiation points 53 as acquired are set as reference points, which is effective.

The invention claimed is:

1. An image measuring system comprising, a projection optical system which has a light projection optical axis and a light source for emitting an illumination light, and projects said illumination light through said light projection optical axis, a photodetection optical system which has a fixed photodetection optical axis and an image pickup element, and receives a retroreflection light from a measuring point by said image pickup element through said photodetection optical axis, and a control arithmetic device for processing the data taken by said image pickup element, wherein said projection optical system comprises a light projection unit for directing said light projection optical axis toward said measuring point and projecting said illumination light, a projection angle changing means for rotating said light projection unit in an elevating direction and a horizontal direction and for changing a projection angle of said illumination light within a range of a field angle of said photodetection optical system, and a direction detecting means for detecting a direction angle of said light projection optical axis with respect to said photodetection optical axis, wherein said control arithmetic device obtains a deviation of said measuring point on said image pickup element with respect to said photodetection optical axis and calculates an elevation angle and a horizontal angle of said measuring point based on said deviation.

2. The image measuring system according to claim 1, wherein said control arithmetic device acquires an irradiation point as an image of said illumination light irradiating to an object to be measured together with an image of an image pickup area, and partially overlaps and connects a plurality of images of said image pickup areas with said irradiation point as a reference.

3. The image measuring system according to claim 1, wherein said control arithmetic device partially overlaps and connects said plurality of images of said image pickup areas, and a reference for overlapping said plurality of images of said image pickup areas is feature points extracted from said images of said image pickup areas.

4. The image measuring system according to claim 1, wherein said image pickup element is a range image sensor, and said range image sensor acquires an image of said object to be measured and three-dimensionally measures an object to be measured per each pixel of said range image sensor.

5. The image measuring system according to claim 1, wherein said image pickup element is an aggregation of pixels, and said projection angle changing means changes a direction of said light projection optical axis in accordance with a pitch of said pixels.

6. The image measuring system according to claim 1, wherein said light source is a semiconductor laser, and said semiconductor laser is configured to emit a light with the drive currents which are not higher than a threshold value and not lower than said threshold value.

7. The image measuring system according to claim 1, wherein said direction detecting means comprises an optical member for dividing a part from said illumination light and a quadrant element for receiving a divided light led to said optical member.

8. The image measuring system according to claim 1, wherein said direction detecting means comprises an optical member for dividing a part from said illumination light and a profile sensor for receiving a divided light led to said optical member.

9. The image measuring system according to claim 1, wherein said light projection unit has a focus function.

10. The image measuring system according to claim 6, wherein said semiconductor laser is configured so as to emit a light with said driving current which is not higher than said threshold value and to irradiate a wide range, and after capture of said object to be measured by said image pickup element, said semiconductor laser is configured so as to emit a light with said driving current which is not lower than said threshold value and to irradiate a necessary point of said object to be measured.

11. The image measuring system according to claim 1 or claim 5, wherein said light projection unit has a luminous flux diameter expanding means for expanding a luminous flux of said illumination light.

12. The image measuring system according to claim 11, wherein said projection unit is configured so as to expand said luminous flux by said luminous flux diameter expanding means and to irradiate a wide range, and capture of said object to be measured by said image pickup element, said projection unit is configured to contract said luminous flux and to irradiate a necessary point of said object to be measured.

13. The image measuring system according to claim 11, wherein said luminous flux diameter expanding means is a diffuser which is provided so as to be insertable into or removable from said light projection optical axis.

14. The image measuring system according to claim 1, wherein said photodetection optical system has a power varying function of increasing a photodetecting magnification.

15. The image measuring system according to claim 12, wherein said luminous flux diameter expanding means is a diffuser which is provided so as to be insertable into or removable from said light projection optical axis.

* * * * *